(12) United States Patent
Koenig et al.

(10) Patent No.: US 8,057,573 B2
(45) Date of Patent: Nov. 15, 2011

(54) ULTRASONIC TREATMENT CHAMBER FOR INCREASING THE SHELF LIFE OF FORMULATIONS

(75) Inventors: David William Koenig, Menasha, WI (US); John Glen Ahles, Neenah, WI (US); Thomas David Ehlert, Neenah, WI (US); Robert Allen Janssen, Alpharetta, GA (US); Paul Warren Rasmussen, Neenah, WI (US); Steve Roffers, Neenah, WI (US); Scott W. Wenzel, Neenah, WI (US); Shiming Zhuang, Menasha, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 990 days.

(21) Appl. No.: 11/966,472

(22) Filed: Dec. 28, 2007

(65) Prior Publication Data

US 2009/0165654 A1 Jul. 2, 2009

(51) Int. Cl.
*B01D 51/08* (2006.01)
(52) U.S. Cl. .............................. 95/30; 96/175
(58) Field of Classification Search .............. 95/29, 30; 96/175; 55/292
See application file for complete search history.

(56) References Cited

U.S. PATENT DOCUMENTS

| | | | |
|---|---|---|---|
| 2,115,056 A | | 4/1938 | Samuel |
| 2,307,206 A | | 1/1943 | Fischer |
| 2,584,053 A | | 1/1952 | Seavey et al. |
| 2,620,894 A | * | 12/1952 | Peterson et al. ............ 95/30 |
| 2,661,192 A | | 12/1953 | Horsley et al. |
| 2,946,981 A | | 7/1960 | O'Neill |
| 3,066,232 A | | 11/1962 | Branson |
| 3,160,138 A | * | 12/1964 | Platzman ............ 116/137 R |
| 3,202,281 A | | 8/1965 | Weston |
| 3,239,998 A | * | 3/1966 | Carter et al. ............ 96/175 |

(Continued)

FOREIGN PATENT DOCUMENTS

CA 2175065 5/1995

(Continued)

OTHER PUBLICATIONS

International Search Report and Written Opinion regarding PCT/IB2008/052760, dated Feb. 17, 2009.

(Continued)

*Primary Examiner* — Duane Smith
*Assistant Examiner* — Sonji Turner
(74) *Attorney, Agent, or Firm* — Armstrong Teasdale LLP (57) ABSTRACT

An ultrasonic treatment system having a treatment chamber for treating a formulation to increase the shelf life thereof. In one embodiment, the shelf life is produced by degassing the formulation using the treatment chamber. Specifically, the treatment chamber has an elongate housing through which a formulation flows longitudinally from an inlet port to a first outlet port and a second outlet port thereof. An elongate ultrasonic waveguide assembly extends within the housing and is operable at a predetermined ultrasonic frequency to ultrasonically energize the formulation within the housing. An elongate ultrasonic horn of the waveguide assembly is disposed at least in part intermediate the inlet and outlet ports, and has a plurality of discrete agitating members in contact with and extending transversely outward from the horn intermediate the inlet and outlet ports in longitudinally spaced relationship with each other. The horn and agitating members are constructed and arranged for dynamic motion of the agitating members relative to the horn at the predetermined frequency and to operate in an ultrasonic cavitation mode of the agitating members corresponding to the predetermined frequency and the formulation being treated in the chamber.

13 Claims, 2 Drawing Sheets

U.S. PATENT DOCUMENTS

| | | | |
|---|---|---|---|
| 3,246,881 A | 4/1966 | Davidson et al. | |
| 3,249,453 A | 5/1966 | Schnoring et al. | |
| 3,273,631 A | 9/1966 | Neuman | |
| 3,275,787 A | 9/1966 | Newberry | |
| 3,278,165 A | 10/1966 | Gaffney | |
| 3,284,991 A * | 11/1966 | Ploeger et al. | 95/30 |
| 3,325,348 A | 6/1967 | Bennett | |
| 3,326,470 A | 6/1967 | Loudin et al. | |
| 3,338,992 A | 8/1967 | Kinney | |
| 3,341,394 A | 9/1967 | Kinney | |
| 3,425,951 A * | 2/1969 | Ishiwata | 159/1.1 |
| 3,463,321 A * | 8/1969 | Vaningen | 210/388 |
| 3,479,873 A | 11/1969 | Hermanns | |
| 3,490,584 A | 1/1970 | Balamuth | |
| 3,502,763 A | 3/1970 | Hartman | |
| 3,519,251 A | 7/1970 | Nystrom et al. | |
| 3,542,345 A | 11/1970 | Kuris | |
| 3,542,615 A | 11/1970 | Dobo et al. | |
| 3,567,185 A | 3/1971 | Ross et al. | |
| 3,591,946 A * | 7/1971 | Loe | 96/175 |
| 3,664,191 A | 5/1972 | Hermanns | |
| 3,692,618 A | 9/1972 | Dorschner et al. | |
| 3,782,547 A | 1/1974 | Dieter | |
| 3,802,817 A | 4/1974 | Matsuki et al. | |
| 3,865,350 A | 2/1975 | Burtis | |
| 3,873,071 A | 3/1975 | Tatebe | |
| 3,904,392 A * | 9/1975 | VanIngen et al. | 95/30 |
| 4,035,151 A | 7/1977 | Czerny et al. | |
| 4,062,768 A | 12/1977 | Elliot | |
| 4,070,167 A * | 1/1978 | Barbee et al. | 96/175 |
| 4,122,797 A * | 10/1978 | Kawamura et al. | 116/137 A |
| 4,168,295 A | 9/1979 | Sawyer | |
| 4,218,221 A | 8/1980 | Cottell | |
| 4,249,986 A | 2/1981 | Obeda | |
| 4,259,021 A | 3/1981 | Goudy, Jr. | |
| 4,260,389 A | 4/1981 | Lister | |
| 4,266,879 A | 5/1981 | McFall | |
| 4,340,563 A | 7/1982 | Appel et al. | |
| 4,372,296 A | 2/1983 | Fahim | |
| 4,398,925 A * | 8/1983 | Trinh et al. | 95/30 |
| 4,425,718 A | 1/1984 | Kawaguchi | |
| 4,511,254 A | 4/1985 | North et al. | |
| 4,556,467 A | 12/1985 | Kuhn | |
| 4,612,016 A | 9/1986 | Jaeger et al. | |
| 4,612,018 A * | 9/1986 | Tsuboi et al. | 95/30 |
| 4,663,220 A | 5/1987 | Wisneski et al. | |
| 4,673,512 A | 6/1987 | Schram | |
| 4,693,879 A | 9/1987 | Yoshimura et al. | |
| 4,699,636 A * | 10/1987 | Bofinger et al. | 95/30 |
| 4,706,509 A | 11/1987 | Riebel | |
| 4,708,878 A | 11/1987 | Hagelauer et al. | |
| 4,726,522 A | 2/1988 | Kokubo et al. | |
| 4,743,361 A | 5/1988 | Schram | |
| 4,848,159 A | 7/1989 | Kennedy et al. | |
| 4,877,516 A | 10/1989 | Schram | |
| 4,879,011 A | 11/1989 | Schram | |
| 4,929,279 A | 5/1990 | Hays | |
| RE33,524 E | 1/1991 | Schram | |
| 4,983,045 A | 1/1991 | Taniguchi | |
| 5,006,266 A | 4/1991 | Schram | |
| 5,026,167 A | 6/1991 | Berliner, III | |
| 5,032,027 A | 7/1991 | Berliner, III | |
| 5,059,249 A | 10/1991 | Hays | |
| 5,096,532 A | 3/1992 | Neuwirth et al. | |
| 5,110,403 A | 5/1992 | Ehlert | |
| 5,122,165 A | 6/1992 | Wang et al. | |
| 5,164,094 A | 11/1992 | Stuckart | |
| 5,169,067 A | 12/1992 | Matsusaka et al. | |
| 5,242,557 A | 9/1993 | Jones et al. | |
| 5,258,413 A | 11/1993 | Isayev | |
| 5,269,297 A | 12/1993 | Weng et al. | |
| 5,326,164 A | 7/1994 | Logan | |
| 5,330,100 A | 7/1994 | Malinowski | |
| 5,335,449 A | 8/1994 | Beatty | |
| 5,372,634 A * | 12/1994 | Monahan | 96/175 |
| 5,373,212 A * | 12/1994 | Beau | 310/316.01 |
| 5,375,926 A | 12/1994 | Omasa | |
| 5,391,000 A | 2/1995 | Taniguchi | |
| 5,466,722 A | 11/1995 | Stoffer et al. | |
| 5,519,670 A * | 5/1996 | Walter | 367/142 |
| 5,536,921 A | 7/1996 | Hedrick et al. | |
| 5,583,292 A | 12/1996 | Karbach et al. | |
| 5,585,565 A | 12/1996 | Glascock et al. | |
| 5,665,383 A | 9/1997 | Grinstaff et al. | |
| 5,681,457 A | 10/1997 | Mahoney | |
| 5,711,888 A | 1/1998 | Trampler et al. | |
| 5,770,124 A | 6/1998 | Marecki et al. | |
| 5,803,270 A | 9/1998 | Brodeur | |
| 5,810,037 A * | 9/1998 | Sasaki et al. | 134/111 |
| 5,831,166 A | 11/1998 | Kozuka et al. | |
| 5,853,456 A * | 12/1998 | Bryan et al. | 95/30 |
| 5,868,153 A | 2/1999 | Cohen et al. | |
| 5,873,968 A | 2/1999 | Pike et al. | |
| 5,902,489 A | 5/1999 | Yasuda et al. | |
| 5,916,203 A | 6/1999 | Brandon et al. | |
| 5,922,355 A | 7/1999 | Parikh et al. | |
| 5,935,883 A | 8/1999 | Pike | |
| 5,937,906 A | 8/1999 | Kozyuk | |
| 5,964,926 A | 10/1999 | Cohen | |
| 5,979,664 A | 11/1999 | Brodeur | |
| 6,010,592 A | 1/2000 | Jameson et al. | |
| 6,020,277 A | 2/2000 | Jameson | |
| 6,035,897 A | 3/2000 | Kozyuk | |
| 6,053,028 A * | 4/2000 | Kraus et al. | 73/1.82 |
| 6,053,424 A | 4/2000 | Gipson et al. | |
| 6,055,859 A | 5/2000 | Kozuka et al. | |
| 6,060,416 A | 5/2000 | Kobata | |
| 6,074,466 A | 6/2000 | Iwasa | |
| 6,090,731 A | 7/2000 | Pike et al. | |
| 6,106,590 A * | 8/2000 | Ueno et al. | 95/30 |
| 6,169,045 B1 | 1/2001 | Pike et al. | |
| 6,200,486 B1 | 3/2001 | Chahine et al. | |
| 6,218,483 B1 | 4/2001 | Muthiah et al. | |
| 6,221,258 B1 | 4/2001 | Feke et al. | |
| 6,254,787 B1 | 7/2001 | Kimura et al. | |
| 6,266,836 B1 | 7/2001 | Gallego Juarez et al. | |
| 6,315,215 B1 | 11/2001 | Gipson et al. | |
| 6,322,240 B1 | 11/2001 | Omasa | |
| 6,332,541 B1 | 12/2001 | Coakley et al. | |
| 6,361,697 B1 | 3/2002 | Coury et al. | |
| 6,368,414 B1 | 4/2002 | Johnson | |
| 6,380,264 B1 | 4/2002 | Jameson et al. | |
| 6,383,301 B1 | 5/2002 | Bell et al. | |
| 6,450,417 B1 | 9/2002 | Gipson et al. | |
| 6,467,350 B1 | 10/2002 | Kaduchak et al. | |
| 6,482,327 B1 | 11/2002 | Mori et al. | |
| 6,506,584 B1 | 1/2003 | Chandler et al. | |
| 6,547,903 B1 | 4/2003 | McNichols et al. | |
| 6,547,935 B2 | 4/2003 | Scott | |
| 6,547,951 B1 | 4/2003 | Maekawa | |
| 6,551,607 B1 | 4/2003 | Minerath, III | |
| 6,576,042 B2 * | 6/2003 | Kraus et al. | 95/30 |
| 6,582,611 B1 | 6/2003 | Kerfoot | |
| 6,593,436 B2 | 7/2003 | Austin et al. | |
| 6,605,252 B2 | 8/2003 | Omasa | |
| 6,620,226 B2 * | 9/2003 | Hutton et al. | 96/175 |
| 6,624,100 B1 | 9/2003 | Pike et al. | |
| 6,627,265 B2 | 9/2003 | Kutilek | |
| 6,648,943 B2 * | 11/2003 | Possanza et al. | 95/30 |
| 6,655,826 B1 | 12/2003 | Leanos | |
| 6,659,365 B2 | 12/2003 | Gipson et al. | |
| 6,676,003 B2 | 1/2004 | Ehlert et al. | |
| 6,689,730 B2 | 2/2004 | Hortel et al. | |
| 6,739,524 B2 | 5/2004 | Taylor-McCune et al. | |
| 6,770,600 B1 | 8/2004 | Lamola | |
| 6,817,541 B2 | 11/2004 | Sands et al. | |
| 6,818,128 B2 | 11/2004 | Minter | |
| 6,837,445 B1 | 1/2005 | Tsai | |
| 6,841,921 B2 | 1/2005 | Stegelmann | |
| 6,858,181 B2 | 2/2005 | Aoyagi | |
| 6,878,288 B2 | 4/2005 | Scott | |
| 6,883,724 B2 | 4/2005 | Adiga et al. | |
| 6,890,593 B2 | 5/2005 | Tian | |
| 6,897,628 B2 | 5/2005 | Gunnerman | |
| 6,902,650 B2 | 6/2005 | Park et al. | |
| 6,911,153 B2 | 6/2005 | Minter | |
| 6,929,750 B2 | 8/2005 | Laurell et al. | |

| | | |
|---|---|---|
| 6,935,770 B2 | 8/2005 | Schueler |
| 6,936,151 B1 | 8/2005 | Lock |
| 7,018,546 B2 | 3/2006 | Kurihara et al. |
| 7,083,322 B2 | 8/2006 | Moore et al. |
| 7,083,764 B2 | 8/2006 | Scott |
| 7,090,391 B2 | 8/2006 | Taniguchi |
| 7,108,137 B2 | 9/2006 | Lal et al. |
| 7,150,779 B2 | 12/2006 | Meegan, Jr. |
| 7,156,201 B2 | 1/2007 | Peshkovskiy et al. |
| 7,293,909 B2 | 11/2007 | Taniguchi |
| 7,322,431 B2 | 1/2008 | Ratcliff |
| 7,338,551 B2 | 3/2008 | Kozyuk |
| 7,404,666 B2 | 7/2008 | Tessien |
| 7,414,009 B2 | 8/2008 | Tanaka et al. |
| 7,419,519 B2 | 9/2008 | Li et al. |
| 7,424,883 B2 | 9/2008 | McNichols et al. |
| 7,465,426 B2 * | 12/2008 | Kerherve et al. ............ 422/68.1 |
| 7,504,075 B2 * | 3/2009 | Marhasin .................. 422/128 |
| 7,516,664 B2 | 4/2009 | Meier et al. |
| 7,533,830 B1 * | 5/2009 | Rose ........................ 239/4 |
| 7,582,156 B2 | 9/2009 | Tanaka et al. |
| 7,673,516 B2 | 3/2010 | Janssen et al. |
| 7,703,698 B2 | 4/2010 | Janssen et al. |
| 7,712,353 B2 | 5/2010 | Janssen et al. |
| 7,735,751 B2 * | 6/2010 | Ehlert et al. ............ 239/102.2 |
| 7,780,743 B2 | 8/2010 | Greaves et al. |
| 7,785,674 B2 | 8/2010 | Janssen et al. |
| 7,947,184 B2 | 5/2011 | Janssen et al. |
| 2001/0040935 A1 | 11/2001 | Case |
| 2002/0036173 A1 | 3/2002 | Feke et al. |
| 2002/0164274 A1 | 11/2002 | Haggett et al. |
| 2003/0042174 A1 * | 3/2003 | Austin ...................... 208/187 |
| 2003/0047067 A1 * | 3/2003 | Kraus et al. ................ 95/30 |
| 2003/0048692 A1 | 3/2003 | Cohen et al. |
| 2003/0051989 A1 * | 3/2003 | Austin ................... 204/157.15 |
| 2003/0061939 A1 * | 4/2003 | Hutton et al. ................ 96/175 |
| 2003/0066899 A1 | 4/2003 | Gipson |
| 2003/0116014 A1 | 6/2003 | Possanza et al. |
| 2003/0143110 A1 | 7/2003 | Kritzler |
| 2003/0194692 A1 | 10/2003 | Purdum |
| 2003/0234173 A1 * | 12/2003 | Minter .................. 204/157.42 |
| 2004/0022695 A1 | 2/2004 | Simon et al. |
| 2004/0065599 A1 | 4/2004 | Lal et al. |
| 2004/0079580 A1 * | 4/2004 | Manna et al. .................. 181/142 |
| 2004/0120904 A1 | 6/2004 | Lye et al. |
| 2004/0142041 A1 | 7/2004 | MacDonald et al. |
| 2004/0187524 A1 | 9/2004 | Sen et al. |
| 2004/0202728 A1 | 10/2004 | Shanker et al. |
| 2005/0000914 A1 | 1/2005 | Dahlberg et al. |
| 2005/0008560 A1 | 1/2005 | Kataoka et al. |
| 2005/0017599 A1 | 1/2005 | Puskas |
| 2005/0025797 A1 | 2/2005 | Wang |
| 2005/0082234 A1 | 4/2005 | Solenthaler |
| 2005/0084438 A1 | 4/2005 | Do et al. |
| 2005/0084464 A1 | 4/2005 | McGrath et al. |
| 2005/0085144 A1 | 4/2005 | MacDonald et al. |
| 2005/0092931 A1 | 5/2005 | Gadgil et al. |
| 2005/0129161 A1 | 6/2005 | Laberge |
| 2005/0207431 A1 | 9/2005 | Beca et al. |
| 2005/0235740 A1 | 10/2005 | Desie |
| 2005/0260106 A1 | 11/2005 | Marhasin |
| 2006/0000034 A1 | 1/2006 | McGrath |
| 2006/0008442 A1 | 1/2006 | MacDonald et al. |
| 2006/0120212 A1 | 6/2006 | Taniguchi et al. |
| 2007/0114306 A1 | 5/2007 | Kawakami et al. |
| 2007/0119785 A1 | 5/2007 | Englehardt et al. |
| 2007/0131034 A1 | 6/2007 | Ehlert et al. |
| 2007/0170277 A1 | 7/2007 | Ehlert |
| 2008/0061000 A1 | 3/2008 | Janssen |
| 2008/0062811 A1 | 3/2008 | Janssen |
| 2008/0063718 A1 | 3/2008 | Janssen |
| 2008/0067418 A1 | 3/2008 | Ross |
| 2008/0069887 A1 | 3/2008 | Baran et al. |
| 2008/0117711 A1 | 5/2008 | Omasa |
| 2008/0155763 A1 | 7/2008 | Janssen et al. |
| 2008/0156737 A1 * | 7/2008 | Janssen et al. ............... 210/748 |
| 2008/0159063 A1 | 7/2008 | Janssen et al. |
| 2008/0192568 A1 | 8/2008 | Hielscher et al. |
| 2008/8251375 | 10/2008 | Hielscher et al. |
| 2009/0014377 A1 | 1/2009 | Janssen et al. |
| 2009/0147905 A1 | 6/2009 | Janssen et al. |
| 2009/0155091 A1 | 6/2009 | Ehlert et al. |
| 2009/0158936 A1 * | 6/2009 | Janssen et al. .................. 96/389 |
| 2009/0162258 A1 | 6/2009 | Janssen et al. |
| 2009/0165223 A1 | 7/2009 | Braunecker et al. |
| 2009/0165654 A1 | 7/2009 | Koenig et al. |
| 2009/0166177 A1 | 7/2009 | Wenzel et al. |
| 2009/0168590 A1 | 7/2009 | Koenig et al. |
| 2009/0168591 A1 | 7/2009 | Wenzel et al. |
| 2009/0262597 A1 | 10/2009 | Kieffer et al. |
| 2010/0150859 A1 * | 6/2010 | Do et al. ...................... 424/76.1 |
| 2010/0206742 A1 | 8/2010 | Janssen et al. |
| 2010/0296975 A1 * | 11/2010 | Peshkovsky et al. ......... 422/128 |

FOREIGN PATENT DOCUMENTS

| | | |
|---|---|---|
| CH | 657067 | 8/1986 |
| CN | 1247628 | 3/2006 |
| CN | 101153138 | 4/2008 |
| DE | 262553 A3 | 12/1988 |
| DE | 9017338 | 3/1991 |
| DE | 4444525 | 6/1996 |
| DE | 19854013 | 5/2000 |
| DE | 19913397 | 9/2000 |
| DE | 19938254 | 2/2001 |
| DE | 29825063 | 6/2004 |
| DE | 102004040233 | 3/2006 |
| DE | 102005025118 | 1/2007 |
| DE | 102005034629 | 1/2007 |
| EP | 0269941 A1 | 6/1988 |
| EP | 0292470 | 11/1988 |
| EP | 347891 | 12/1989 |
| EP | 0457187 A2 | 11/1991 |
| EP | 0459967 | 12/1991 |
| EP | 0625482 | 11/1994 |
| EP | 0648531 | 4/1995 |
| EP | 0894612 A2 | 2/1999 |
| EP | 1954388 | 3/2007 |
| EP | 0983968 | 3/2008 |
| EP | 2173669 A2 | 4/2010 |
| EP | 2176173 A2 | 4/2010 |
| FR | 2793811 | 11/2000 |
| GB | 1404575 | 9/1975 |
| JP | 56028221 | 3/1981 |
| JP | 57119853 | 7/1982 |
| JP | 58034051 | 2/1983 |
| JP | 62001413 A * | 1/1987 |
| JP | 62039839 U | 3/1987 |
| JP | 6372364 | 4/1988 |
| JP | 63104664 | 5/1988 |
| JP | 1108081 | 4/1989 |
| JP | 2025602 | 1/1990 |
| JP | 02281185 A | 11/1990 |
| JP | 03053195 A | 3/1991 |
| JP | 3086258 | 4/1991 |
| JP | 03-157129 A | 5/1991 |
| JP | 6228824 | 8/1994 |
| JP | 8304388 | 11/1996 |
| JP | 9286943 | 11/1997 |
| JP | 10060331 | 3/1998 |
| JP | 11133661 | 5/1999 |
| JP | 2000158364 | 12/1999 |
| JP | 2001017970 | 1/2001 |
| JP | 2001252588 | 9/2001 |
| JP | 2003103152 A | 4/2003 |
| JP | 2004020176 | 1/2004 |
| JP | 2004256783 | 9/2004 |
| JP | 2005118688 | 5/2005 |
| KR | 20020073778 A | 9/2002 |
| KR | 1020050013858 A | 2/2005 |
| KR | 1020050113356 A | 12/2005 |
| WO | 9400757 | 1/1994 |
| WO | 9420833 | 9/1994 |
| WO | 9429873 A | 12/1994 |
| WO | 9600318 | 1/1996 |
| WO | 9609112 A1 | 3/1996 |
| WO | 9743026 | 11/1997 |
| WO | 9817373 | 4/1998 |
| WO | 9844058 | 10/1998 |

| | | |
|---|---|---|
| WO | 9933520 | 7/1999 |
| WO | 0004978 | 2/2000 |
| WO | 0041794 | 7/2000 |
| WO | 0139200 A | 5/2001 |
| WO | 0222252 | 3/2002 |
| WO | 0250511 | 6/2002 |
| WO | 02080668 A2 | 10/2002 |
| WO | 03012800 | 2/2003 |
| WO | 03102737 | 12/2003 |
| WO | 2004026452 | 4/2004 |
| WO | 2004064487 | 8/2004 |
| WO | 2005011804 | 2/2005 |
| WO | 2006037591 | 4/2006 |
| WO | 2006043970 A2 | 4/2006 |
| WO | 2006073645 A1 | 7/2006 |
| WO | 2006074921 | 7/2006 |
| WO | 2006093804 | 9/2006 |
| WO | 2007011520 A2 | 1/2007 |
| WO | 2007060245 A1 | 5/2007 |
| WO | 2007095871 | 8/2007 |
| WO | 2008029379 | 3/2008 |
| WO | 2008047259 | 4/2008 |
| WO | 2008085806 | 7/2008 |

OTHER PUBLICATIONS

International Search Report and Written Opinion, PCT/IB2008/055051 (Feb. 20, 2009).
Supplementary European Search Report issued in EP Application No. 08789242 mailed Dec. 17, 2010.
International Search Report and Written Opinion issued Aug. 18, 2009 for PCT/IB2008/055520.
International Search Report and Written Opinion issued Aug. 18, 2009 for PCT/IB2008/055517.
International Search Report and Written Opinion issued Aug. 18, 2009 for PCT/IB2008/055518.
Takehi Moriguchi, et al. "Metal-modified silica adsorbents for removal of humic substances in water." Journal of Colloid and Interface Science 283, 2005 300-310, See Abstract, pp. 301 and 304.
International Search Report and Written Opinion regarding PCT/IB2009/055090, dated Jul. 16, 2010.
International Search Report and Written Opinion regarding PCT/IB2009/055092, dated Jul. 16, 2010.
International Search Report and Written Opinion regarding PCT/IB2008/055514, dated Aug. 25, 2009.
English translation of Nagel WO 2006/074921 A1, accessed on the EPO website.
International Search Report and Written Opinion for PCT/IB2008/052764 mailed Apr. 2, 2009.
Brenner et al, Single-bubble sonoluminescence, Reviews of Modern Physics, vol. 74, Apr. 2002, pp. 425-484.
International Search Report and Written Opinion regarding PCT/IB2007/054892 dated May 15, 2008.
International Search Report and Written Opinion regarding PCT/IB2007/054898 dated May 15, 2008.
International Search Report and Written Opinion regarding PCT/IB2008/055394, dated Sep. 28, 2009.
Blume, T. and Neis, U. "Improved wastewater disinfection by ultrasonic pre-treatment." Ultrasonics Sonochemistry, 2004, No. 11, pp. 333-336.
International Search Report and Written Opinion regarding PCT/IB2008/055395, dated Sep. 14, 2009.
International Search Report and Written Opinion regarding PCT/IB2007/052947, dated Mar. 12, 2008.
International Search Report and Written Opinion regarding PCT/IB2007/052945, dated Feb. 1, 2008.
International Search Report and Written Opinion regarding PCT/IB2007/052988, dated Feb. 14, 2008.
Tal-Figiel B., The Formation of Stable W/O, O/W, W/O/W Cosmetic Emulsions in an Ultrasonic Field, viewed at http://www.atypon-link.com/ICHEME/doi/abs/10.1205/cherd06199 on Oct. 19, 2007.
International Search Report and Written Opinion regarding PCT/IB2007/053621, dated Feb. 14, 2008.
International Search Report and Written Opinion regarding PCT/IB2007/053623, dated Feb. 14, 2008.
International Search Report and Written Opinion regarding PCT/IB2007/053622, dated Feb. 14, 2008.
International Search Report and Written Opinion from PCT/IB2008/052766, dated Mar. 31, 2009.
Kuo et al., "Nano-particles dispersion effect on Ni/Al2O3 Composite Coatings," Materials Chemistry and Physics, 86: 5-10 (2004).
Sivakumar et al., "Preparation of nanosized TiO2 supported on activated alumina by a sonochemical method: observation of an increased photocatalytic decolourisation efficiency," Research on Chemical Intermediates, 30(7-8): 785-792 (2004).
International Search Report and Written Opinion regarding PCT/IB2008/055396, dated Jul. 29, 2009.
Oct. 27, 2010 Letter regarding the Office Action issued for Mexican Patent Application Serial No. MX/a/2009/002519 mailed Oct. 12, 2010.
J.D. Lawson, "Some Criteria for a Power Producing Thermonuclear Reactor", Proc. Phys. Soc. B70, pp. 6-10 (1957).
L.A. Artsimovich, "Controlled Thermonuclear Reactions", Gordon and Breach Science Publishers, New York, first English translation, 1964.
D.R.O. Morrison, "Cold Fusion Update No. 9", Jan. 1994, from Newsgroups sci.physics.fusion, http://www.groups.google.com.
J. Lister, Plasma Physics and Controlled Fusion 48, pp. 715-716 (2006).
U.S. Department of Energy, "Report of the Review of Low Energy Nuclear Reactions", Dec. 1, 2004 (USDOE).
European Office Action regarding European Application No. 07805228.9, dated Oct. 9, 2009.
Taleyarkhan, et al., "Evidence for Nuclear Emissions During Acoustic Cavitation," Science, (Mar. 8, 2002), vol. 295, pp. 1868-1873.
Kloeppel, James E. "Temperature inside collapsing bubble four times that of the sun," News Bureau, University of Illinois at Urbana-Champaign.
"Controlled Thermonuclear Fusion" viewed at http://library.thinkquest.org/17940/texts/fusion_controlled/fusion_controlled.html on Oct. 23, 2007.
Flannigan, "Measurement of Pressure and Density Inside a Single Sonoluminescing Bubble," Physical Review Letters (May 26, 2006), PRL 96.
Taleyarkhan, et al. "Additional Evidence of Nuclear Emissions During Acoustic Cavitation," Physical Review E, (Mar. 2004). vol. 69.
"Thermonuclear Fusion Energy Source for Future Generations," viewed at http://nature.com/news/2006/060109/full/060109-5.html on May 4, 2007.
Lahey, Taleyarkhan, and Nigmatulin, "Bubble Power,"IEEE spectrum, May 2005, pp. 39-43.
Peplow, Mark, "Desktop fusion is back on the table," viewed at http//nature.com/news/2006/060109/full/060109-5.html on May 4, 2007.
Final Office Action issued in U.S. Appl. No. 11/966,458, dated Mar. 17, 2011.
Final Office Action issued in U.S. Appl. No. 11/530,183, dated Mar. 22, 2011.
Final Office Action issued in U.S. Appl. No. 12/335,231, dated Mar. 31, 2011.
Barbaglia et al., "Search of Fusion Reactions During the Cavitation of a Single Bubble in Deuterated Liquids," Physica Scripta 72, pp. 75-78 (2005).

* cited by examiner

ULTRASONIC TREATMENT CHAMBER FOR INCREASING THE SHELF LIFE OF FORMULATIONS

FIELD OF DISCLOSURE

The present disclosure relates generally to systems for ultrasonically treating various formulations to improve the shelf life thereof. More particularly, an ultrasonic treatment system is disclosed for ultrasonically treating a formulation, such as cosmetic formulations, to remove an effluent gas therefrom to increase the shelf-life of the formulation. In one embodiment, the ultrasonic treatment system further is capable of delivering a stabilizer or another component to the formulation to further increase the shelf-life of the formulation.

BACKGROUND OF DISCLOSURE

Numerous conventional formulations such as cosmetic formulations for providing benefits, including, for example, absorbing water, modifying feel, thickening the formulation, and/or protecting skin, include oxygen sensitive compounds with high oxidative potential, such as retinol (vitamin A), ascorbic acid (vitamin C), tocopherol (vitamin E), resveratrol, polyphenols, polyphenol-rich ingredients such as legumes, fruits (e.g., apples, blackberries, strawberries, and the like, and combinations thereof), vegetables (e.g., broccoli, cabbage, celery, onion and parsley), red wine, chocolate, green tea, olive oil, bee pollen, essential fatty acids (e.g., omega-3 and omega-6 fatty acids), omega-rich ingredients such as fish oils and flax seed oils, and vitamin C-rich ingredients such as rose hip oils. These compounds are extremely good antioxidants that are beneficial for the formulation and to consumers as they neutralize free radicals, provide anti-aging benefits, nourish the skin, and provide various other benefits. Even with the multiple benefits of these compounds, because of their antioxidant potential, many of these compounds are inherently unstable to oxidative conditions and therefore, a formulation including these compounds typically requires one or more processing conditions to prevent the exposure of these sensitive actives to oxidative conditions that could cause these compounds to lose activity or modify over time. For example, in many formulations, the addition of stabilizers for extending the formulation's shelf life has been found desirable.

Furthermore, the above-described formulations are currently prepared in a batch-type process, either by a cold mix or a hot mix procedure. The cold mix procedure generally consists of multiple ingredients or phases being added into a kettle in a sequential order with agitation being applied via a blade, baffles, or a vortex. The hot mix procedure is conducted similarly to the cold mix procedure with the exception that the ingredients or phases are generally heated above room temperature, for example to temperatures of from about 40 to about 100° C., prior to mixing, and are then cooled back to room temperature after the ingredients and phases have been mixed. In both procedures, the oxygen sensitive compounds (and, their respective stabilizers) are added to the other ingredients manually by one of a number of methods including dumping, pouring, and/or sifting.

These conventional methods of mixing oxygen sensitive compounds into formulations have several problems. For example, inappropriate handling of the sensitive compounds and other ingredients can lead to espousing the ingredients to an oxidizing atmosphere before mixing. Furthermore, by using one of the above described batch procedures, several hours are required to complete the process, which can not only be extremely expensive, but can also increase the chance of exposing the oxygen sensitive compounds and other ingredients to oxidizing conditions.

Based on the foregoing, there is a need in the art for a treatment system that provides ultrasonic energy to treat formulations to improve shelf life. Specifically, there is a need for a treatment system that can both remove effluent gas, such as oxygen, from a formulation to prevent exposure of oxygen sensitive compounds to oxidative conditions and/or sufficiently mix stabilizers and other components into the formulation to improve shelf life.

SUMMARY OF DISCLOSURE

In one aspect, an ultrasonic treatment system for treating a formulation to improve the shelf life or the formulation generally comprises a treatment chamber comprising an elongate housing having longitudinally opposite ends and an interior space. The housing of the treatment chamber is generally closed at at least one of its longitudinal ends and has at least one inlet port for receiving a formulation into the interior space of the housing; a first outlet port through which an effluent gas removed from the formulation is exhausted from the housing; and a second outlet port through which a treated formulation is exhausted from the housing following ultrasonic treatment of the formulation. The outlet ports are spaced longitudinally from the inlet port such that liquid (i.e., formulation) flows longitudinally within the interior space of the housing from the inlet port to the outlet ports. In one embodiment, the housing includes two separate ports for receiving separate components of the formulation. At least one elongate ultrasonic waveguide assembly extends longitudinally within the interior space of the housing and is operable at a predetermined ultrasonic frequency to ultrasonically energize and treat the formulation flowing within the housing.

The waveguide assembly comprises an elongate ultrasonic horn disposed at least in part intermediate the inlet port and the first and second outlet ports of the housing and has an outer surface located for contact with the formulation flowing within the housing from the inlet port to the outlet ports. A plurality of discrete agitating members are in contact with and extend transversely outward from the outer surface of the horn intermediate the inlet port and the outlet ports in longitudinally spaced relationship with each other. The agitating members and the horn are constructed and arranged for dynamic motion of the agitating members relative to the horn upon ultrasonic vibration of the horn at the predetermined frequency and to operate in an ultrasonic cavitation mode of the agitating members corresponding to the predetermined frequency and the formulation being treated in the chamber.

As such, the present disclosure is directed to an ultrasonic treatment system for treating formulations to increase shelf life. The treatment system comprises a treatment chamber for treating the formulation. The treatment chamber generally comprises an elongate housing having longitudinally opposite ends and an interior space, and an elongate ultrasonic waveguide assembly extending longitudinally within the interior space of the housing and being operable at a predetermined ultrasonic frequency to ultrasonically energize and treat the formulation flowing within the housing. The housing is generally closed at at least one of its longitudinal ends and has at least one inlet port for receiving a formulation into the interior space of the housing; a first outlet port through which an effluent gas removed from the formulation is exhausted from the housing following ultrasonic treatment of the formulation; and a second outlet port through which a treated formulation is exhausted from the housing. The first and second outlet ports are spaced longitudinally from the inlet port such that the formulation flows longitudinally within the interior space of the housing from the inlet port to the first and second outlet ports. The first outlet port is spaced longitudinally below the second outlet port.

The waveguide assembly comprises an elongate ultrasonic horn disposed at least in part intermediate the inlet port and the first and second outlet ports of the housing and having an outer surface located for contact with the formulation flowing within the housing from the inlet port to the first and second outlet ports. Additionally, the waveguide assembly comprises a plurality of discrete agitating members in contact with and extending transversely outward from the outer surface of the horn intermediate the inlet port and the first and second outlet ports in longitudinally spaced relationship with each other. The agitating members and the horn are constructed and arranged for dynamic motion of the agitating members relative to the horn upon ultrasonic vibration of the horn at the predetermined frequency and to operate in an ultrasonic cavitation mode of the agitating members corresponding to the predetermined frequency and the formulation being treated in the chamber.

The present invention is further directed to an ultrasonic treatment system for increasing the shelf life of a formulation. The treatment system comprises a treatment chamber for treating the formulation. The treatment chamber generally comprises an elongate housing having longitudinally opposite ends and an interior space, and an elongate ultrasonic waveguide assembly extending longitudinally within the interior space of the housing and being operable at a predetermined ultrasonic frequency to ultrasonically energize and treat the formulation flowing within the housing. The housing is generally closed at at least one of its longitudinal ends and has at least one inlet port for receiving a formulation into the interior space of the housing; a first outlet port through which an effluent gas removed from the formulation is exhausted from the housing following ultrasonic treatment of the formulation; and a second outlet port through which a treated formulation is exhausted from the housing. The first and second outlet ports are spaced longitudinally from the inlet port such that the formulation flows longitudinally within the interior space of the housing from the inlet port to the first and second outlet ports. The first outlet port is spaced longitudinally below the second outlet port. A screen assembly is further disposed longitudinally between the first inlet port and the second inlet port. In one particularly preferred embodiment, the screen assembly includes a cone-shaped screen as described more fully herein.

The waveguide assembly comprises an elongate ultrasonic horn disposed at least in part intermediate the inlet port and the first and second outlet port of the housing and having an outer surface located for contact with the formulation flowing within the housing from the inlet port to the first and second outlet ports, and a plurality of discrete agitating members in contact with and extending transversely outward from the outer surface of the horn intermediate the inlet port and the first and second outlet ports in longitudinally spaced relationship with each other. The agitating members and the horn are constructed and arranged for dynamic motion of the agitating members relative to the horn upon ultrasonic vibration of the horn at the predetermined frequency and to operate in an ultrasonic cavitation mode of the agitating members corresponding to the predetermined frequency and the formulation being treated in the chamber.

The present invention is further directed to an ultrasonic treatment system for increasing the shelf life of a formulation. The treatment system comprises a treatment chamber for treating the formulation. The treatment chamber generally comprises an elongate housing having longitudinally opposite ends and an interior space, and an elongate ultrasonic waveguide assembly extending longitudinally within the interior space of the housing and being operable at a predetermined ultrasonic frequency to ultrasonically energize and treat the formulation flowing within the housing. The housing is generally closed at at least one of its longitudinal ends and has at least one inlet port for receiving a formulation into the interior space of the housing; a first outlet port through which an effluent gas removed from the formulation is exhausted from the housing following ultrasonic treatment of the formulation; and a second outlet port through which a treated formulation is exhausted from the housing. The first and second outlet ports are spaced longitudinally from the inlet port such that the formulation flows longitudinally within the interior space of the housing from the inlet port to the first and second outlet ports. The first outlet port is spaced longitudinally below the second outlet port. A screen assembly is further disposed longitudinally between the first inlet port and second inlet port.

The waveguide assembly comprises an elongate ultrasonic horn disposed at least in part intermediate the inlet port and the first and second outlet ports of the housing and having an outer surface located for contact with the formulation flowing within the housing from the inlet port to the first and second outlet ports; a plurality of discrete agitating members in contact with and extending transversely outward from the outer surface of the horn intermediate the inlet port and the first and second outlet ports in longitudinally spaced relationship with each other; and a baffle assembly disposed within the interior space of the housing and extending at least in part transversely inward from the housing toward the horn to direct longitudinally flowing formulation in the housing to flow transversely inward into contact with the agitating members. The agitating members and the horn are constructed and arranged for dynamic motion of the agitating members relative to the horn upon ultrasonic vibration of the horn at the predetermined frequency and to operate in an ultrasonic cavitation mode of the agitating members corresponding to the predetermined frequency and the formulation being treated in the chamber.

The present disclosure is further directed to a method for increasing the shelf life of a formulation using the ultrasonic treatment system described above. The method comprises delivering the formulation via the inlet port into the interior space of the housing; ultrasonically treating the formulation via the elongate ultrasonic waveguide assembly operating in the predetermined ultrasonic frequency; exhausting the effluent gas removed from the formulation from the housing via the first outlet port; and exhausting the treated formulation with the effluent gas removed from the housing via the second outlet port.

Other features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
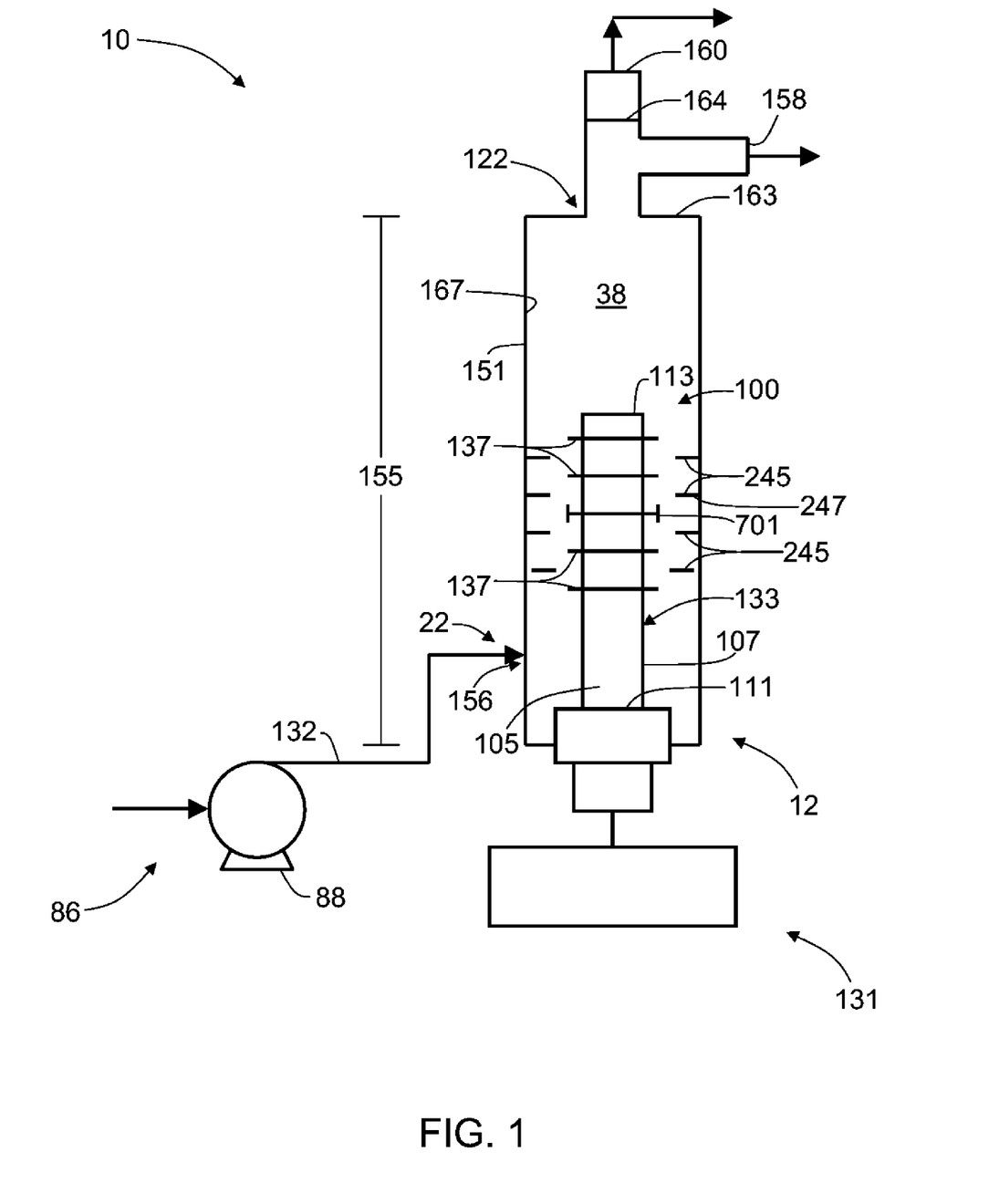
FIG. 1 is a schematic of an ultrasonic treatment system according to a first embodiment of the present disclosure for increasing the shelf life of a formulation.

With particular reference now to FIG. 1, in one embodiment, an ultrasonic treatment system, generally indicated at 10 for increasing the shelf life of a formulation generally comprises a treatment chamber 12 that is operable to ultrasonically treat a formulation, and further is capable of creating a cavitation mode that allows for better removing one or more effluent gases from a formulation within the housing 151 of the chamber 12.

It is generally believed that as ultrasonic energy is created by the waveguide assembly, increased cavitation of the formulation occurs, creating microbubbles. As these microbubbles then collapse, the pressure within the formulation is increased forcibly exhausting effluent gas, such as oxygen, within the formulation. Furthermore, in one embodiment, the pressure within the formulation can allow better mixing and dispersion of one or more additional components (such as stabilizers and influent gases described below) within and throughout the formulation.

The term "liquid" and "formulation" are used interchangeably to refer to a single component formulation, a formulation comprised of two or more components in which at least one of the components is a liquid such as a liquid-liquid formulation or a liquid-gas formulation or a liquid emulsion in which particulate matter is entrained, or other viscous fluids.

The ultrasonic treatment system 10 of FIG. 1 is further described herein with reference to use of the treatment chamber 12 in the ultrasonic treatment system to treat a formulation to create a treated formulation having an increased shelf life. The treated formulation typically has effluent gases, such as oxygen gas, nitrogen gas, argon gas, carbon dioxide gas, and combinations thereof, that can decrease the formulation product's shelf life removed. As used herein, the term "effluent gas" refers to a gas that can adversely affect the formulation's shelf life or other functional property, and thus, is the gas to be removed from the formulation via the ultrasonic treatment system. Furthermore, the treated formulation can have additional components, such as stabilizers and other influent gases added thereto that can provide formulations such as cosmetic formulations with a further increased shelf life and/or additional beneficial properties such as improved feel, water absorption, thickening, and/or skin benefits to a user's skin. The term "influent gas", in contrast to "effluent gas" described above is any gas that is capable of providing improved functional (e.g., shelf life) or physical properties to the formulation, and is thus, added to the formulation using the ultrasonic treatment system. Suitable influent gases can include nitric oxide, nitrogen gas, perfluorocarbon, carbon dioxide, helium, argon, neon, hydrogen, methane, and combinations thereof. By way of example, in one embodiment, a formulation such as a cosmetic formulation can be treated to remove the oxidative conditions (i.e., oxygen gas) from the formulation and can further be treated to add nitric oxide to improve skin health. It should be understood by one skilled in the art, however, that while described herein with respect to cosmetic formulations, the ultrasonic treatment system can be used to treat various other formulations. For example, other suitable formulations can include hand sanitizers, anti-aging lotions, wound care serums, teeth whitening gels, animate and inanimate surface cleansers, wet wipe solutions, suntan lotions, paints, inks, coatings, and polishes for both industrial and consumer products.

In one particularly preferred embodiment, as illustrated in FIG. 1, the treatment chamber 12 is generally elongate and has a general inlet end 22 (a lower end in the orientation of the illustrated embodiment) and a general outlet end 122 (an upper end in the orientation of the illustrated embodiment). The treatment chamber 12 is configured such that liquid (e.g., formulation) enters the treatment chamber 12 generally at the inlet end 22 thereof, flows generally longitudinally within the chamber (e.g., upward in the orientation of illustrated embodiment) and exits the chamber generally at the outlet end 122 of the chamber 12.

The terms "upper" and "lower" are used herein in accordance with the vertical orientation of the treatment chamber 12 illustrated in the various drawings and are not intended to describe a necessary orientation of the chamber 12 in use. That is, while the chamber 12 is most suitably oriented vertically, with the outlet end 122 of the chamber above the inlet end 22 as illustrated in the drawing, it should be understood that the chamber may be oriented with the inlet end above the outlet end, or it may be oriented other than in a vertical orientation and remain within the scope of this disclosure.

The terms "axial" and "longitudinal" refer directionally herein to the vertical direction of the chamber 12 (e.g., end-to-end such as the vertical direction in the illustrated embodiment of FIG. 1). The terms "transverse", "lateral" and "radial" refer herein to a direction normal to the axial (e.g., longitudinal) direction. The terms "inner" and "outer" are also used in reference to a direction transverse to the axial direction of the treatment chamber 12, with the term "inner" referring to a direction toward the interior of the chamber and the term "outer" referring to a direction toward the exterior of the chamber.

The inlet end 22 of the treatment chamber 12 is in fluid communication with at least one suitable delivery system, generally indicated at 86, that is operable to direct one or more formulations to, and more suitably through, the chamber 12. Typically, the delivery system 86 may comprise one or more pumps 88 operable to pump the respective formulation from a corresponding source thereof (not shown) to the inlet end 22 of the chamber 12 via suitable conduits 132.

It is understood that the delivery system 86 may be configured to deliver more than one formulation, or more than one component for a single formulation, such as when mixing the components to create the formulation, to the treatment chamber 12 without departing from the scope of this disclosure. It is also contemplated that delivery systems other than that illustrated in FIG. 1 and described herein may be used to deliver one or more formulations to the inlet end 22 of the treatment chamber 12 without departing from the scope of this disclosure. It should be understood that more than one formulation can refer to two streams of the same formulation or different formulations being delivered to the inlet end of the treatment chamber without departing from the scope of the present disclosure.

Typically, the delivery system operates to deliver the formulation to the interior space of the housing through the inlet port at a flow rate of from about 0.1 liters per minute to about 100 liters per minute. More suitably, the formulation is delivered to the interior space of the housing at a rate of from about 1 liter per minute to about 10 liters per minute.

The treatment chamber 12 comprises a housing defining an interior space 38 of the chamber 12 through which a formulation delivered to the chamber 12 flows from the inlet end 22 to the outlet end 122 thereof. The housing 12 suitably comprises an elongate tube 155 generally defining, at least in part, a sidewall 151 of the chamber 12. The housing 12 may have one or more inlet ports (generally indicated in FIG. 1 at 156)

formed therein through which one or more formulations to be treated within the chamber 12 are delivered to the interior space 38 thereof. It should be understood by one skilled in the art that the inlet end of the housing may include more than one port, more than two ports, and even more than three ports. For example, although not shown, the housing may comprise two inlet ports, wherein the first inlet port and the second inlet port are suitably in parallel, spaced relationship with each other.

As shown in FIG. 1, the housing 12 comprises a closure 163 connected to and substantially closing the longitudinally opposite end of the sidewall, and having at least one outlet port therein (FIG. 1 depicts two outlet ports, 158 and 160) to generally define the outlet end 122 of the treatment chamber 12. The sidewall 151 (e.g., defined by the elongate tube) of the chamber 12 has an inner surface 167 that together with the waveguide assembly 100 (as described below) and the closure 163 define the interior space 38 of the chamber 12.

In the illustrated embodiment of FIG. 1, the tube 155 is generally cylindrical so that the chamber sidewall 151 is generally annular in cross-section. However, it is contemplated that the cross-section of the chamber sidewall 151 may be other than annular, such as polygonal or another suitable shape, and remains within the scope of this disclosure. The chamber sidewall 151 of the illustrated chamber 12 is suitably constructed of a transparent material, although it is understood that any suitable material may be used as long as the material is compatible with the formulations being treated within the chamber, the pressure at which the chamber is intended to operate, and other environmental conditions within the chamber such as temperature.

A waveguide assembly, generally indicated at 100, extends longitudinally at least in part within the interior space 38 of the chamber 12 to ultrasonically energize the formulation (and any of its components) flowing through the interior space 38 of the chamber 12. In particular, the waveguide assembly 100 of the illustrated embodiment extends longitudinally from the lower or inlet end 22 of the chamber 12 up into the interior space 38 thereof to a terminal end 113 of the waveguide assembly disposed intermediate the second outlet port (e.g., outlet port 160 where it is present). Although illustrated in FIG. 1 as extending longitudinally into the interior space 38 of the chamber 12, it should be understood by one skilled in the art that the waveguide assembly may extend laterally from a housing sidewall of the chamber, running horizontally through the interior space thereof without departing from the scope of the present disclosure. Typically, the waveguide assembly 100 is mounted, either directly or indirectly, to the chamber housing 12 as will be described later herein.

Still referring to FIG. 1, the waveguide assembly 100 suitably comprises an elongate horn assembly, generally indicated at 133, disposed entirely with the interior space 38 of the housing 12 intermediate the inlet port 156 and the first outlet port 158 and second outlet port 160 for complete submersion within the formulation being treated within the chamber 12, and more suitably, in the illustrated embodiment, it is aligned coaxially with the chamber sidewall 151 The horn assembly 133 has an outer surface 107 that together with an inner surface 167 of the sidewall 151 defines a flow path within the interior space 38 of the chamber 12 along which the formulation (and its components) flows past the horn within the chamber (this portion of the flow path being broadly referred to herein as the ultrasonic treatment zone). The horn assembly 133 has an upper end defining a terminal end of the horn assembly (and therefore the terminal end 113 of the waveguide assembly) and a longitudinally opposite lower end 111. Although not shown, it is particularly preferable that the waveguide assembly 100 also comprises a booster coaxially aligned with and connected at an upper end thereof to the lower end 111 of the horn assembly 133. It is understood, however, that the waveguide assembly 100 may comprise only the horn assembly 133 and remain within the scope of this disclosure. It is also contemplated that the booster may be disposed entirely exterior of the chamber housing 12, with the horn assembly 133 mounted on the chamber housing 12 without departing from the scope of this disclosure.

The waveguide assembly 100, and more particularly the booster is suitably mounted on the chamber housing, e.g., on the tube 155 defining the chamber sidewall 151, at the upper end thereof by a mounting member (not shown) that is configured to vibrationally isolate the waveguide assembly (which vibrates ultrasonically during operation thereof) from the treatment chamber housing. That is, the mounting member inhibits the transfer of longitudinal and transverse mechanical vibration of the waveguide assembly 100 to the chamber housing 12 while maintaining the desired transverse position of the waveguide assembly (and in particular the horn assembly 133) within the interior space 38 of the chamber housing and allowing both longitudinal and transverse displacement of the horn assembly within the chamber housing. The mounting member also at least in part (e.g., along with the booster, lower end of the horn assembly, and/or closure 163) closes the outlet end 122 of the chamber 12. Examples of suitable mounting member configurations are illustrated and described in U.S. Pat. No. 6,676,003, the entire disclosure of which is incorporated herein by reference to the extent it is consistent herewith.

In one particularly suitable embodiment the mounting member is of single piece construction. Even more suitably the mounting member may be formed integrally with the booster (and more broadly with the waveguide assembly 100). However, it is understood that the mounting member may be constructed separately from the waveguide assembly 100 and remain within the scope of this disclosure. It is also understood that one or more components of the mounting member may be separately constructed and suitably connected or otherwise assembled together.

In one suitable embodiment, the mounting member is further constructed to be generally rigid (e.g., resistant to static displacement under load) so as to hold the waveguide assembly 100 in proper alignment within the interior space 38 of the chamber 12. For example, the rigid mounting member in one embodiment may be constructed of a non-elastomeric material, more suitably metal, and even more suitably the same metal from which the booster (and more broadly the waveguide assembly 100) is constructed. The term "rigid" is not, however, intended to mean that the mounting member is incapable of dynamic flexing and/or bending in response to ultrasonic vibration of the waveguide assembly 100. In other embodiments, the rigid mounting member may be constructed of an elastomeric material that is sufficiently resistant to static displacement under load but is otherwise capable of dynamic flexing and/or bending in response to ultrasonic vibration of the waveguide assembly 100.

A suitable ultrasonic drive system 131 including at least an exciter (not shown) and a power source (not shown) is disposed exterior of the chamber 12 and operatively connected to the booster (not shown) (and more broadly to the waveguide assembly 100) to energize the waveguide assembly to mechanically vibrate ultrasonically. Examples of suitable ultrasonic drive systems 131 include a Model 20A3000 system available from Dukane Ultrasonics of St. Charles, Ill., and a Model 2000CS system available from Herrmann Ultrasonics of Schaumberg, Ill.

In one embodiment, the drive system 131 is capable of operating the waveguide assembly 100 at a frequency in the range of about 15 kHz to about 100 kHz, more suitably in the range of about 15 kHz to about 60 kHz, and even more suitably in the range of about 20 kHz to about 40 kHz. Such ultrasonic drive systems 131 are well known to those skilled in the art and need not be further described herein.

In some embodiments, however not illustrated, the treatment chamber can include more than one waveguide assembly having at least two horn assemblies for ultrasonically treating formulation. As noted above, the treatment chamber comprises a housing defining an interior space of the chamber through which the formulation is delivered from an inlet end. The housing comprises an elongate tube defining, at least in part, a sidewall of the chamber. As with the embodiment including only one waveguide assembly as described above, the tube may have one or more inlet ports formed therein, through which one or more formulations to be treated within the chamber are delivered to the interior space thereof, and at least a first outlet port and a second outlet port through which the treated formulation exits the chamber.

In such an embodiment, two or more waveguide assemblies extend longitudinally at least in part within the interior space of the chamber to ultrasonically energize and treat the formulation flowing through the interior space of the chamber. Each waveguide assembly separately includes an elongate horn assembly, each disposed entirely within the interior space of the housing intermediate the inlet port and the outlet ports for complete submersion within the formulation being treated within the chamber. Each horn assembly can be independently constructed as described more fully herein (including the horns, along with the plurality of agitating members and baffle assemblies).

Referring back to FIG. 1, the horn assembly 133 comprises an elongate, generally cylindrical horn 105 having an outer surface 107, and two or more (i.e., a plurality of) agitating members 137 connected to the horn and extending at least in part transversely outward from the outer surface of the horn in longitudinally spaced relationship with each other. The horn 105 is suitably sized to have a length equal to about one-half of the resonating wavelength (otherwise commonly referred to as one-half wavelength) of the horn. In one particular embodiment, the horn 105 is suitably configured to resonate in the ultrasonic frequency ranges recited previously, and most suitably at 20 kHz. For example, the horn 105 may be suitably constructed of a titanium alloy (e.g., $Ti_6Al_4V$) and sized to resonate at 20 kHz. The one-half wavelength horn 105 operating at such frequencies thus has a length (corresponding to a one-half wavelength) in the range of about 4 inches to about 6 inches, more suitably in the range of about 4.5 inches to about 5.5 inches, even more suitably in the range of about 5.0 inches to about 5.5 inches, and most suitably a length of about 5.25 inches (133.4 mm). It is understood, however, that the treatment chamber 12 may include a horn 105 sized to have any increment of one-half wavelength without departing from the scope of this disclosure.

In one embodiment (not shown), the agitating members 137 comprise a series of five washer-shaped rings that extend continuously about the circumference of the horn in longitudinally spaced relationship with each other and transversely outward from the outer surface of the horn. In this manner the vibrational displacement of each of the agitating members relative to the horn is relatively uniform about the circumference of the horn. It is understood, however, that the agitating members need not each be continuous about the circumference of the horn. For example, the agitating members may instead be in the form of spokes, blades, fins or other discrete structural members that extend transversely outward from the outer surface of the horn. For example, as illustrated in FIG. 1, one of the five agitating members is in a T-shape 701. Specifically, the T-shaped agitating member 701 surrounds the nodal region. It has been found that members in the T-shape, generate a strong radial (e.g., horizontal) acoustic wave that further increases the cavitation effect as described more fully herein.

By way of a dimensional example, the horn assembly 133 of the illustrated embodiment of FIG. 1 has a length of about 5.25 inches (133.4 mm), one of the rings 137 is suitably disposed adjacent the terminal end 113 of the horn 105 (and hence of the waveguide assembly 100), and more suitably is longitudinally spaced approximately 0.063 inches (1.6 mm) from the terminal end of the horn 105. In other embodiments the uppermost ring may be disposed at the terminal end of the horn 105 and remain within the scope of this disclosure. The rings 137 are each about 0.125 inches (3.2 mm) in thickness and are longitudinally spaced from each other (between facing surfaces of the rings) a distance of about 0.875 inches (22.2 mm).

It is understood that the number of agitating members 137 (e.g., the rings in the illustrated embodiment) may be less than or more than five without departing from the scope of this disclosure. It is also understood that the longitudinal spacing between the agitating members 137 may be other than as illustrated in FIG. 1 and described above (e.g., either closer or spaced further apart). Furthermore, while the rings 137 illustrated in FIG. 1 are equally longitudinally spaced from each other, it is alternatively contemplated that where more than two agitating members are present the spacing between longitudinally consecutive agitating members need not be uniform to remain within the scope of this disclosure.

In particular, the locations of the agitating members 137 are at least in part a function of the intended vibratory displacement of the agitating members upon vibration of the horn assembly 133. For example, in the illustrated embodiment of FIG. 1, the horn assembly 133 has a nodal region located generally longitudinally centrally of the horn 105 (e.g., at the third ring). As used herein and more particularly shown in FIG. 1, the "nodal region" of the horn 105 refers to a longitudinal region or segment of the horn member along which little (or no) longitudinal displacement occurs during ultrasonic vibration of the horn and transverse (e.g., radial in the illustrated embodiment) displacement of the horn is generally maximized. Transverse displacement of the horn assembly 133 suitably comprises transverse expansion of the horn but may also include transverse movement (e.g., bending) of the horn.

In the illustrated embodiment of FIG. 1, the configuration of the one-half wavelength horn 105 is such that the nodal region is particularly defined by a nodal plane (i.e., a plane transverse to the horn member at which no longitudinal displacement occurs while transverse displacement is generally maximized) is present. This plane is also sometimes referred to as a "nodal point". Accordingly, agitating members 137 (e.g., in the illustrated embodiment, the rings) that are disposed longitudinally further from the nodal region of the horn 105 will experience primarily longitudinal displacement while agitating members that are longitudinally nearer to the nodal region will experience an increased amount of transverse displacement and a decreased amount of longitudinal displacement relative to the longitudinally distal agitating members.

It is understood that the horn 105 may be configured so that the nodal region is other than centrally located longitudinally on the horn member without departing from the scope of this disclosure. It is also understood that one or more of the agitating members 137 may be longitudinally located on the horn so as to experience both longitudinal and transverse displacement relative to the horn upon ultrasonic vibration of the horn 105.

Still referring to FIG. 1, the agitating members 137 are sufficiently constructed (e.g., in material and/or dimension such as thickness and transverse length, which is the distance that the agitating member extends transversely outward from the outer surface 107 of the horn 105) to facilitate dynamic motion, and in particular dynamic flexing/bending of the agitating members in response to the ultrasonic vibration of the horn. In one particularly suitable embodiment, for a given ultrasonic frequency at which the waveguide assembly 100 is to be operated in the treatment chamber (otherwise referred to herein as the predetermined frequency of the waveguide assembly) and a particular formulation to be treated within the chamber 12, the agitating members 137 and horn 105 are suitably constructed and arranged to operate the agitating members in what is referred to herein as an ultrasonic cavitation mode at the predetermined frequency.

As used herein, the ultrasonic cavitation mode of the agitating members refers to the vibrational displacement of the agitating members sufficient to result in cavitation (i.e., the formation, growth, and implosive collapse of bubbles in a liquid) of the formulation being treated at the predetermined ultrasonic frequency. For example, where the formulation flowing within the chamber comprises an aqueous liquid formulation, and the ultrasonic frequency at which the waveguide assembly 100 is to be operated (i.e., the predetermined frequency) is about 20 kHZ, one or more of the agitating members 137 are suitably constructed to provide a vibrational displacement of at least 1.75 mils (i.e., 0.00175 inches, or 0.044 mm) to establish a cavitation mode of the agitating members.

It is understood that the waveguide assembly 100 may be configured differently (e.g., in material, size, etc.) to achieve a desired cavitation mode associated with the particular formulation to be treated. For example, as the viscosity of the formulation changes, the cavitation mode of the agitating members may need to be changed.

In particularly suitable embodiments, the cavitation mode of the agitating members corresponds to a resonant mode of the agitating members whereby vibrational displacement of the agitating members is amplified relative to the displacement of the horn. However, it is understood that cavitation may occur without the agitating members operating in their resonant mode, or even at a vibrational displacement that is greater than the displacement of the horn, without departing from the scope of this disclosure.

In one suitable embodiment, a ratio of the transverse length of at least one and, more suitably, all of the agitating members to the thickness of the agitating member is in the range of about 2:1 to about 6:1. As another example, the rings each extend transversely outward from the outer surface 107 of the horn 105 a length of about 0.5 inches (12.7 mm) and the thickness of each ring is about 0.125 inches (3.2 mm), so that the ratio of transverse length to thickness of each ring is about 4:1. It is understood, however that the thickness and/or the transverse length of the agitating members may be other than that of the rings as described above without departing from the scope of this disclosure. Also, while the agitating members 137 (rings) may suitably each have the same transverse length and thickness, it is understood that the agitating members may have different thicknesses and/or transverse lengths.

In the above described embodiment, the transverse length of the agitating member also at least in part defines the size (and at least in part the direction) of the flow path along which the formulation or other flowable components in the interior space of the chamber flows past the horn. For example, the horn may have a radius of about 0.875 inches (22.2 mm) and the transverse length of each ring is, as discussed above, about 0.5 inches (12.7 mm). The radius of the inner surface of the housing sidewall is approximately 1.75 inches (44.5 mm) so that the transverse spacing between each ring and the inner surface of the housing sidewall is about 0.375 inches (9.5 mm). It is contemplated that the spacing between the horn outer surface and the inner surface of the chamber sidewall and/or between the agitating members and the inner surface of the chamber sidewall may be greater or less than described above without departing from the scope of this disclosure.

In general, the horn 105 may be constructed of a metal having suitable acoustical and mechanical properties. Examples of suitable metals for construction of the horn 105 include, without limitation, aluminum, monel, titanium, stainless steel, and some alloy steels. It is also contemplated that all or part of the horn 105 may be coated with another metal such as silver, platinum, gold, palladium, lead dioxide, and copper to mention a few. In one particularly suitable embodiment, the agitating members 137 are constructed of the same material as the horn 105, and are more suitably formed integrally with the horn. In other embodiments, one or more of the agitating members 137 may instead be formed separate from the horn 105 and connected thereto.

While the agitating members 137 (e.g., the rings) illustrated in FIG. 1 are relatively flat, i.e., relatively rectangular in cross-section, it is understood that the rings may have a cross-section that is other than rectangular without departing from the scope of this disclosure. The term "cross-section" is used in this instance to refer to a cross-section taken along one transverse direction (e.g., radially in the illustrated embodiment) relative to the horn outer surface 107). Additionally, as seen of the first two and last two agitating members 137 (e.g., the rings) illustrated in FIG. 1 are constructed only to have a transverse component, it is contemplated that one or more of the agitating members may have at least one longitudinal (e.g., axial) component to take advantage of transverse vibrational displacement of the horn (e.g., at the third agitating member as illustrated in FIG. 1) during ultrasonic vibration of the waveguide assembly 100.

Additionally, a baffle assembly, generally indicated at 245 is disposed within the interior space 153 of the chamber housing 151, and in particular generally transversely adjacent the inner surface 167 of the sidewall 151 and in generally transversely opposed relationship with the horn 105. In one suitable embodiment, the baffle assembly 245 comprises one or more baffle members 247 disposed adjacent the inner surface 167 of the housing sidewall 151 and extending at least in part transversely inward from the inner surface of the sidewall 167 toward the horn 105. More suitably, the one or more baffle members 247 extend transversely inward from the housing sidewall inner surface 167 to a position longitudinally intersticed with the agitating members 137 that extend outward from the outer surface 107 of the horn 105. The term "longitudinally intersticed" is used herein to mean that a longitudinal line drawn parallel to the longitudinal axis of the horn 105 passes through both the agitating members 137 and the baffle members 247. As one example, in the illustrated embodiment, the baffle assembly 245 comprises four, generally annular baffle members 247 (i.e., extending continuously about the horn 105) longitudinally intersticed with the five agitating members 237.

As a more particular example, the four annular baffle members 247 illustrated in FIG. 1 are of the same thickness as the agitating members 137 in our previous dimensional example (i.e., 0.125 inches (3.2 mm)) and are spaced longitudinally from each other (e.g., between opposed faces of consecutive baffle members) equal to the longitudinal spacing between the rings (i.e., 0.875 inches (22.2 mm)). Each of the annular baffle members 247 has a transverse length (e.g., inward of the inner surface 167 of the housing sidewall 151) of about 0.5 inches (12.7 mm) so that the innermost edges of the baffle members extend transversely inward beyond the outermost edges of the agitating members 137 (e.g., the rings). It is understood, however, that the baffle members 247 need not extend transversely inward beyond the outermost edges of the agitating members 137 of the horn 105 to remain within the scope of this disclosure.

It will be appreciated that the baffle members 247 thus extend into the flow path of the formulation that flows within the interior space 38 of the chamber 12 past the horn 105 (e.g., within the ultrasonic treatment zone). As such, the baffle members 247 inhibit the formulation from flowing along the inner surface 167 of the chamber sidewall 151 past the horn 105, and more suitably the baffle members facilitate the flow of the formulation transversely inward toward the horn for flowing over the agitating members of the horn to thereby facilitate ultrasonic energization (i.e., agitation) of the formulation to initiate both removal of effluent gases from the formulation and/or mixing of other components (e.g., stabilizers and influent gases) within the formulation to form the treated formulation.

In one embodiment, to inhibit gas bubbles against stagnating or otherwise building up along the inner surface 167 of the sidewall 151 and across the face on the underside of each baffle member 247, e.g., as a result of agitation of the formulation, a series of notches (broadly openings) may be formed in the outer edge of each of the baffle members (not shown) to facilitate the flow of gas (e.g., gas bubbles) between the outer edges of the baffle members and the inner surface of the chamber sidewall. For example, in one particularly preferred embodiment, four such notches are formed in the outer edge of each of the baffle members in equally spaced relationship with each other. It is understood that openings may be formed in the baffle members other than at the outer edges where the baffle members abut the housing, and remain within the scope of this disclosure. It is also understood, that these notches may number more or less than four, as discussed above, and may even be completely omitted.

It is further contemplated that the baffle members 247 need not be annular or otherwise extend continuously about the horn 105. For example, the baffle members 247 may extend discontinuously about the horn 105, such as in the form of spokes, bumps, segments or other discrete structural formations that extend transversely inward from adjacent the inner surface 167 of the housing sidewall 151. The term "continuously" in reference to the baffle members 247 extending continuously about the horn does not exclude a baffle member as being two or more arcuate segments arranged in end-to-end abutting relationship, i.e., as long as no significant gap is formed between such segments. Suitable baffle member configurations are disclosed in U.S. application Ser. No. 11/530,311 (filed Sep. 8, 2006), which is hereby incorporated by reference to the extent it is consistent herewith.

Also, while the baffle members 247 illustrated in FIG. 1 are each generally flat, e.g., having a generally thin rectangular cross-section, it is contemplated that one or more of the baffle members may each be other than generally flat or rectangular in cross-section to further facilitate the flow of bubbles along the interior space 38 of the chamber 12. The term "cross-section" is used in this instance to refer to a cross-section taken along one transverse direction (e.g., radially in the illustrated embodiment, relative to the horn outer surface 107).

As noted above and illustrated in FIG. 1, the treatment chamber 12 includes at least a first outlet port 158 and a second outlet port 160. The first outlet port 158 is capable of allowing the exit of effluent gas (not shown), which has been removed from the formulation, from the interior space 38 of the treatment chamber 12. The second outlet port 160 is capable of allowing the exit of the treated formulation (from which effluent gas has been removed and/or influent gas or other components, such as stabilizers, have been added) from the interior space 38 of the treatment chamber 12.

Figure 2:
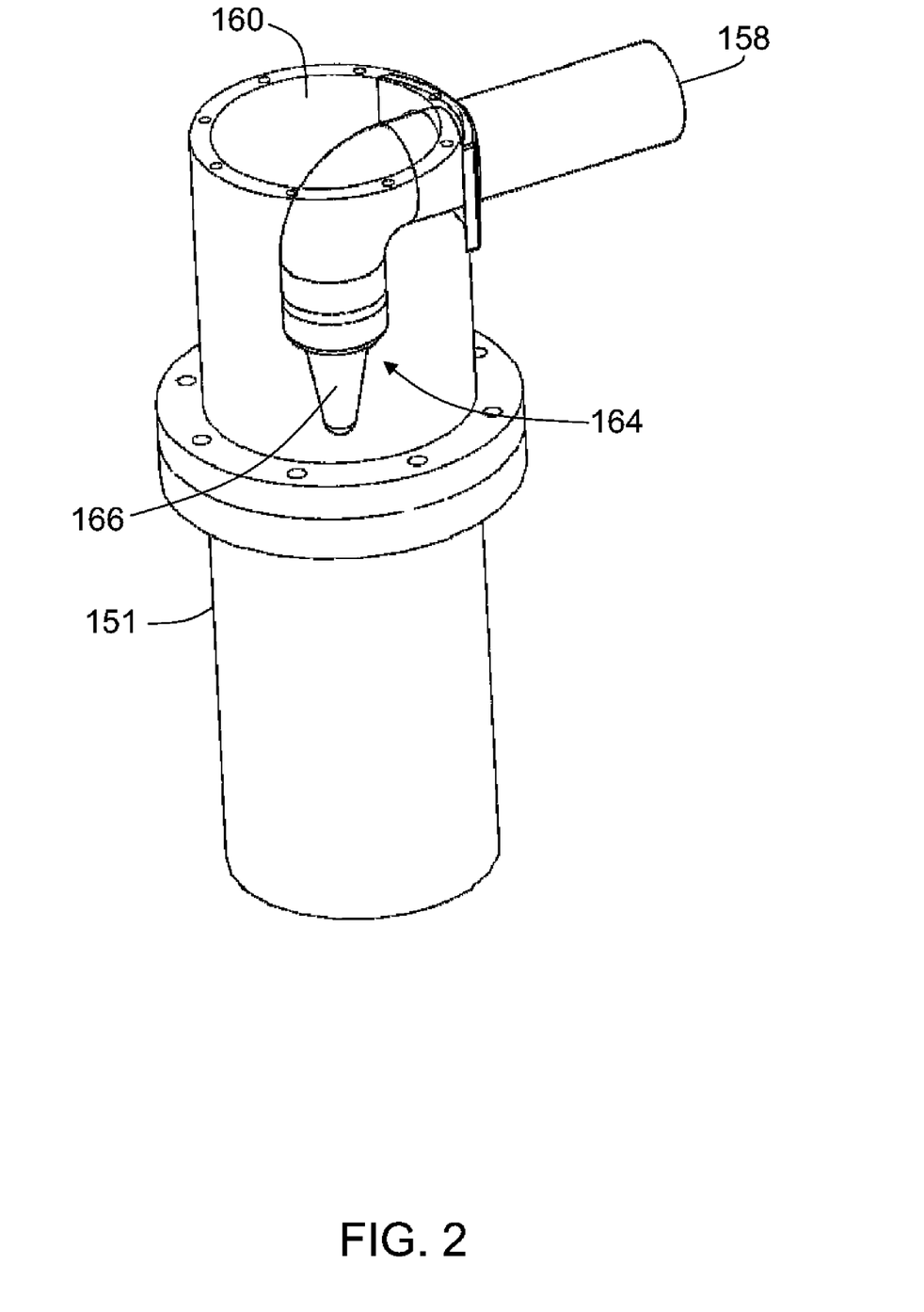
FIG. 2 is a screen assembly for use in the ultrasonic treatment system of FIG. 1.

In one embodiment, as shown in FIG. 2, the ultrasonic mixing system may further comprise a screen assembly, generally indicated at 164, disposed at the outlet end of the treatment chamber. Specifically, the screen assembly is suitably disposed longitudinally between the first outlet port 158 and the second outlet port 160. The screen assembly 164 typically allows the formulation (not shown) to flows through, however, the screen assembly 164 prevents the gas bubbles of effluent gas that have been removed from the formulation from flowing through.

Specifically, in one particularly preferred embodiment, the screen assembly 164 includes a cone-shaped screen 166 having a pore size of from about 1 micron to about 1000 microns. More suitably, the screen assembly 164 includes a screen 166 having a pore size of from about 50 micron to about 500 microns, and even more suitably, about 2 microns. The number and pour size of screens for use in the screen assembly will typically depend on the effluent gas to be removed from the treated formulation within the treatment chamber.

Referring back to FIG. 1, once effluent gas (if any) has been removed from the formulation and filtered through the screen assembly, the treated formulation (without effluent gas) exits the treatment chamber 12 through the second outlet port 160. As the effluent gas is trapped at the screen assembly 164 and forced to exit treatment chamber 12 via the first outlet port 158, it is desirable that, in one embodiment, the first outlet port 158 is spaced longitudinally below the second outlet port 160. It should be recognized that while described herein in terms of the effluent gas exiting the chamber 12 via the first outlet port 158 and the treated formulation exiting via the second outlet port 160, the treatment chamber 12 can be configured other than as described above and the treated formulation could exit through the first outlet port and the effluent gas could exit through the second outlet port without departing from the scope of the present disclosure. Furthermore, the first outlet port could be spaced other than as described above, such as longitudinally above the second outlet port without departing from the present disclosure.

In operation according to one embodiment of the ultrasonic treatment system of the present disclosure, the treatment system (more specifically, the treatment chamber) is used to remove one or more effluent gases from a formulation and/or mix/disperse an additional component into the formulation to increase the shelf life of the formulation. Specifically, a formulation is delivered (e.g., by the pumps described above) via conduits to one or more inlet ports formed in the treatment chamber housing. The formulation can be any suitable formulation known in the art. For example, suitable formulations can include hydrophilic formulations, hydrophobic formulations, siliphilic formulations, and combinations thereof. Examples of particularly suitable formulations to be treated within the ultrasonic treatment system of the present disclosure can include emulsions such as oil-in-water emulsions, water-in-oil emulsions, water-in-oil-in-water emulsions, oilin-water-in-oil emulsions, water-in-silicone emulsions, water-in-silicone-in-water emulsions, glycol-in-silicone emulsion, high internal phase emulsions, hydrogels, and the like. High internal phase emulsions are well known in the art and typically refer to emulsions having from about 70% (by total weight emulsion) to about 80% (by total weight emulsion) of an oil phase. Furthermore, as known by one skilled in the art, "hydrogel" typically refers to a hydrophilic base that is thickened with rheology modifiers and or thickeners to form a gel. For example a hydrogel can be formed with a base consisting of water that is thickened with a carbomer that has been neutralized with a base.

Generally, from about 0.1 liters per minute to about 100 liters per minute of the formulation is typically delivered into the treatment chamber housing. More suitably, the amount of formulation delivered into the treatment chamber housing is from about 1.0 liters per minute to about 10 liters per minute.

In one embodiment, the formulation is prepared using the ultrasonic treatment system simultaneously during delivery of the formulation into the interior space of the housing and treating of the formulation within the chamber housing. In such an embodiment, the treatment chamber can include more than one inlet port to deliver the separate components of the formulation into the interior space of the housing. For example, in one embodiment, a first component of the formulation can be delivered via a first inlet port into the interior space of the treatment chamber housing and a second component of the formulation can be delivered via a second inlet port into the interior space of the treatment chamber housing. The first component is delivered via the first inlet port to the interior space of the housing at a flow rate of from about 0.1 liters per minute to about 100 liters per minute, and the second component is delivered via the second inlet port to the interior space of the housing at a flow rate of from about 1 milliliter per minute to about 1000 milliliters per minute.

Typically, the first and second inlet ports are disposed in parallel along the sidewall of the treatment chamber housing. In an alternative embodiment, the first and second inlet ports are disposed on opposing sidewalls of the treatment chamber housing. While described herein as having two inlet ports, it should be understood by one skilled in the art that more than two inlet ports can be used to deliver the various components of the formulations without departing from the scope of the present disclosure.

Furthermore, as noted above, additional components that can facilitate increasing the shelf life of the formulation or provide a further benefit to the user of the formulation can be mixed/dispersed within the formulation using the ultrasonic treatment system. Specifically, the additional component or ingredient can be delivered into the interior space of the treatment chamber via a second delivery system, having one or more pumps, or the like, through a second inlet port. In accordance with the above embodiment, as the formulation and additional components continue to flow upward within the chamber, the waveguide assembly, and more particularly the horn assembly, is driven by the drive system to vibrate at a predetermined ultrasonic frequency. In response to ultrasonic excitation of the horn, the agitating members that extend outward from the outer surface of the horn dynamically flex/bend relative to the horn, or displace transversely (depending on the longitudinal position of the agitating member relative to the nodal region of the horn).

The formulation and additional components continuously flow longitudinally along the flow path between the horn assembly and the inner surface of the housing sidewall so that the ultrasonic vibration and the dynamic motion of the agitating members causes cavitation in the formulation to further facilitate agitation. The baffle members disrupt the longitudinal flow of formulation along the inner surface of the housing sidewall and repeatedly direct the flow transversely inward to flow over the vibrating agitating members.

As the treated formulation (and the additional components now dispersed therein) flows longitudinally upstream past the terminal end of the waveguide assembly, an initial back mixing of the treated formulation also occurs as a result of the dynamic motion of the agitating member at or adjacent the terminal end of the horn. Further upstream flow of the treated formulation results in the agitated formulation providing a more uniform mixture of the components (e.g., components of formulation and additional beneficial components) prior to exiting the treatment chamber via the outlet port.

Suitable additional components can be any components that are capable of providing a benefit to the formulation. Specifically, in one embodiment, the additional components can be stabilizers to protect the formulation (and its components) from oxidative conditions and other environmental conditions that can adversely affect the shelf life of the formulation. Specifically, stabilizers such as reducing agents (e.g., butylated hydroxytoluene (BHT), butylated hydroxyanisole (BHA), thioglycolate, thiosulfate, reazurin, and the like, and combinations thereof), vitamins (e.g., vitamin A (retinol) vitamin E (tocopherol) and vitamin C (ascorbic acid), and combinations thereof), and combinations thereof, can be added to the formulation treated in the ultrasonic treatment system.

When added, the stabilizers typically make up from about 0.01% (by weight) to about 10% (by weight) of the formulation. More suitably, the formulation typically includes from about 0.1% (by weight) to about 5% (by weight) stabilizers.

In another embodiment, influent gas can be delivered into the interior space of the treatment chamber via a delivery system, and through a second inlet port. In one embodiment, a gas sparge may be included in the ultrasonic treatment system to force influent gas into the interior space of the housing. Specifically, the gas sparge facilitates the flow of influent gas transversely inward toward the horn to thereby facilitate ultrasonic energization (i.e., agitation) which can mix the influent gas with the formulation to allow for dispersion of the influent gas within and throughout the formulation. Desirably, the gas sparge used in the treatment system has a gas diffuser porosity rated from medium to fine and a gas flow rate of from about 0.001 liters per minute to about 10 liters per minute and, more suitably, from about 0.01 liters per minute to about 5 liters per minute. Furthermore, the gas sparge forces influent gas into the interior of the housing at a gas pressure of from about 0.2 psi gauge pressure to about 100 psi gauge pressure and, more suitably, from about 10 psi gauge pressure to about 50 psi gauge pressure, depending upon the desired influent gas flow rate and back pressure of the treatment system.

In accordance with the above embodiment, due to the cavitation produced within the ultrasonic treatment chamber, as described above, microbubbles of influent gas within the formulation are created. As these microbubbles then collapse, the pressure and temperature within the formulation are both increased, allowing for better dispersion of the influent gas within and throughout the formulation. Furthermore, as noted above, due to the configuration of the treatment chamber, back-mixing of the treated formulation occurs, further mixing the influent gas within and throughout the formulation.

Suitable influent gases include any suitable gas for providing a physical or functional benefit to the formulation. Suitable influent gases include, for example, nitric oxide, nitrogen gas, perfluorocarbon, carbon dioxide, helium, argon, neon, and combinations thereof. In one particularly preferred embodiment, the influent gas is nitric oxide, which can be used for wound healing and anti-inflammatory purposes. Typically, when added, the influent gas is added in an amount to supersaturate the formulation.

In one embodiment, the formulation (or one or more of its components) is heated prior to being delivered to the treatment chamber. With some formulations, while the individual components have a relatively low viscosity (i.e., a viscosity below 100 cps), the resulting formulation made with the components has a high viscosity (i.e., a viscosity greater than 100 cps), which can result in clumping of the formulation and clogging of the inlet port of the treatment chamber. For example, many water-in-oil emulsions can suffer from clumping during mixing. In these types of formulations, the water and/or oil components are heated to a temperature of approximately 40° C. or higher. Suitably, the formulation (or one or more of its components) can be heated to a temperature of from about 70° C. to about 100° C. prior to being delivered to the treatment chamber via the inlet port.

Additionally, the method includes ultrasonically treating the formulation (and its components) via the elongate ultrasonic waveguide assembly operating in the predetermined ultrasonic frequency, as described above. Specifically, as the formulation (and its components) continuously flows longitudinally along the flow path between the horn assembly and the inner surface of the housing sidewall so that the ultrasonic vibration and the dynamic motion of the agitating members cause cavitation in the formulation, which entraps effluent gas into the microbubbles produced therein. The entrapped gas bubbles remain separated from the formulation through the interior space of the housing and are trapped by the screen assembly as described above. The treated formulation (with entrapped effluent gas separated out) can then flow through the screen assembly and exit the treatment chamber via an outlet port. The entrapped gas bubbles can separately be removed from the treatment chamber via a separate outlet port.

In one embodiment, once exited, the treated formulation can be directed to a post-processing delivery system to be further processed and/or delivered to one or more packaging units. Without being limiting, for example, the treated formulation is desirably further processed to form a cosmetic formulation containing an oxygen sensitive compound such as olive oil. As used herein, "oxygen sensitive" refers to a compound or ingredient having a high oxidative potential. In such an embodiment, the treated formulation (having effluent gas removed) can be directed to a post-processing delivery system to be mixed with a desired amount of olive oil in an oxygen-free environment and then delivered to one or more packaging units for the consumer.

The present disclosure is illustrated by the following Example which is merely for the purpose of illustration and is not to be regarded as limiting the scope of the disclosure or manner in which it may be practiced.

EXAMPLE 1

In this Example, oxygen gas was removed from water using the ultrasonic treatment system of FIG. 1 of the present disclosure. The ability of the ultrasonic treatment system to effectively degas the water formulation was analyzed.

Approximately 1.5 liters of tap water (22° C.) were added to the ultrasonic treatment chamber of FIG. 1. The amount of oxygen in the water formulation was measured to be 8.74 ppm. The ultrasonic treatment system was operated for 1 minute with a power input of approximately 3.0 kilowatts.

The water formulation was removed from the treatment system and again the oxygen in the water formulation was measured. After ultrasonically treating the water formulation, 5.50 ppm oxygen was present in the water formulation (22° C.), showing a 37% decrease in oxygen.

When introducing elements of the present disclosure or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method for increasing the shelf life of a formulation using an ultrasonic treatment system, the method comprising:
    delivering the formulation via at least one inlet port into an interior space of an elongate housing of a treatment chamber, the housing being generally closed at least one longitudinal end; and the treatment chamber further comprising an elongate ultrasonic waveguide assembly extending longitudinally within the interior space of the housing and being operable at a predetermined ultrasonic frequency to ultrasonically energize and treat the formulation flowing within the housing, the waveguide assembly comprising an elongate ultrasonic horn disposed at least in part intermediate the inlet port and a first outlet port and a second outlet port of the housing and having an outer surface located for contact with the formulation flowing within the housing from the inlet port to the first and second outlet ports, and a plurality of discrete agitating members in contact with and extending transversely outward from the outer surface of the horn intermediate the inlet port and the first and second outlet ports in longitudinally spaced relationship with each other, the agitating members and the horn being constructed and arranged for dynamic motion of the agitating members relative to the horn upon ultrasonic vibration of the horn at the predetermined frequency and to operate in an ultrasonic cavitation mode of the agitating members corresponding to the predetermined frequency and the formulation being treated in the chamber;
    ultrasonically treating the formulation via the elongate ultrasonic waveguide assembly operating in the predetermined ultrasonic frequency;
    exhausting an effluent gas removed from the formulation from the housing via the first outlet port; and
    exhausting a treated formulation from the housing via the second outlet port, wherein the treated formulation has the effluent gas removed therefrom, the first and second outlet ports being independently spaced longitudinally from the inlet port such that the formulation flows longitudinally within the interior space of the housing from the inlet port to the first and second outlet ports, and wherein the first outlet port is spaced longitudinally below the second outlet port.

2. The method as set forth in claim 1 wherein the effluent gas is selected from the group consisting of oxygen gas, nitrogen gas, argon gas, carbon dioxide gas, and combinations thereof.

3. The method as set forth in claim 1 wherein the formulation is delivered to the interior space of the housing at a flow rate of from about 0.1 liters per minute to about 100 liters per minute.

4. The method as set forth in claim 1 wherein the inlet port is a first inlet port, the method further comprising a delivering at least one stabilizer via a second inlet port into the interior space of the housing, wherein the second inlet port is oriented in parallel spaced relationship with the first inlet port.

5. The method as set forth in claim 1 wherein the formulation is heated prior to being delivered to the interior space of the housing.

6. The method as set forth in claim 1 wherein the formulation is ultrasonically treated using the predetermined frequency being in a range of from about 20 kHz to about 40 kHz.

7. The method as set forth in claim 1 wherein the inlet port is a first inlet port, the method further comprising a delivering an influent gas via a second inlet port into the interior space of the housing, wherein the second inlet port is oriented in parallel spaced relationship with the first inlet port.

8. The method as set forth in claim 7 wherein the influent gas is selected from the group consisting of nitric oxide, nitrogen gas, perfluorocarbon, carbon dioxide, helium, argon, neon, hydrogen, methane, and combinations thereof.

9. The method as set forth in claim 7 wherein the treatment chamber further comprises a screen assembly disposed longitudinally between the first inlet port and the second inlet port.

10. The method as set forth in claim 1 wherein the formulation is selected from the group consisting of hydrophilic formulations, hydrophobic formulations, siliphilic formulations, and combinations thereof.

11. The method as set forth in claim 4 wherein the stabilizer is selected from the group consisting of reducing agents, vitamins, antioxidants, and combinations thereof.

12. The method as set forth in claim 4 wherein the treatment chamber further comprises a screen assembly disposed longitudinally between the first inlet port and the second inlet port.

13. The method as set forth in claim 1, wherein the treatment chamber further comprises a baffle assembly disposed within the interior space of the housing and extending at least in part transversely inward from the housing toward the horn to direct longitudinally flowing formulation in the housing to flow transversely inward into contact with the agitating members.

* * * * *

UNITED STATES PATENT AND TRADEMARK OFFICE
CERTIFICATE OF CORRECTION

PATENT NO. : 8,057,573 B2
APPLICATION NO. : 11/966472
DATED : November 15, 2011
INVENTOR(S) : David William Koenig et al.

It is certified that error appears in the above-identified patent and that said Letters Patent is hereby corrected as shown below:

In the Claims,

In Claim 1, Column 18, Line 24, delete "closed at least" and insert -- closed at at least -- therefor.

Signed and Sealed this
Second Day of June, 2015

Michelle K. Lee
*Director of the United States Patent and Trademark Office*